(12) United States Patent
Hada

(10) Patent No.: US 8,305,444 B2
(45) Date of Patent: Nov. 6, 2012

(54) INTEGRATED VISUAL DISPLAY SYSTEM

(75) Inventor: Hideki Hada, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 915 days.

(21) Appl. No.: 12/271,305

(22) Filed: Nov. 14, 2008

(65) Prior Publication Data
US 2010/0123778 A1 May 20, 2010

(51) Int. Cl.
H04N 7/18 (2006.01)
(52) U.S. Cl. ........................................ 348/148
(58) Field of Classification Search ............ 348/148
See application file for complete search history.

(56) References Cited

U.S. PATENT DOCUMENTS

| | | | |
|---|---|---|---|
| 5,654,715 A * | 8/1997 | Hayashikura et al. | 342/70 |
| 5,765,116 A * | 6/1998 | Wilson-Jones et al. | 701/41 |
| 5,848,373 A | 12/1998 | DeLorme et al. | |
| 6,138,062 A * | 10/2000 | Usami | 701/23 |
| 6,223,125 B1 | 4/2001 | Hall | |
| 6,434,450 B1 | 8/2002 | Griffin, Jr. et al. | |
| 6,812,942 B2 | 11/2004 | Ribak | |
| 6,882,906 B2 | 4/2005 | Geisler et al. | |
| 6,975,932 B2 | 12/2005 | Obradovich | |
| 6,985,073 B1 | 1/2006 | Doan | |
| 7,158,015 B2 * | 1/2007 | Rao et al. | 340/436 |
| 7,482,909 B2 * | 1/2009 | Haug | 340/436 |
| 2002/0003571 A1 * | 1/2002 | Schofield et al. | 348/148 |
| 2002/0017985 A1 * | 2/2002 | Schofield et al. | 340/436 |
| 2002/0105439 A1 * | 8/2002 | Kiridena et al. | 340/905 |
| 2002/0167589 A1 * | 11/2002 | Schofield et al. | 348/148 |
| 2004/0042638 A1 * | 3/2004 | Iwano | 382/104 |
| 2004/0233285 A1 * | 11/2004 | Seleznev et al. | 348/148 |
| 2005/0216184 A1 | 9/2005 | Ehlers | |
| 2005/0225439 A1 * | 10/2005 | Watanabe et al. | 340/435 |
| 2005/0259033 A1 * | 11/2005 | Levine | 345/7 |
| 2006/0132601 A1 * | 6/2006 | Kukita et al. | 348/148 |
| 2006/0274147 A1 * | 12/2006 | Chinomi et al. | 348/118 |
| 2006/0290482 A1 | 12/2006 | Matsumoto et al. | |
| 2006/0293856 A1 * | 12/2006 | Foessel et al. | 701/301 |
| 2007/0120656 A1 * | 5/2007 | Nakanishi et al. | 340/435 |
| 2007/0182528 A1 * | 8/2007 | Breed et al. | 340/435 |
| 2008/0055411 A1 | 3/2008 | Lee | |
| 2008/0122604 A1 * | 5/2008 | Hattori et al. | 340/441 |
| 2009/0040306 A1 * | 2/2009 | Foote et al. | 348/148 |
| 2009/0079553 A1 * | 3/2009 | Yanagi et al. | 340/435 |
| 2009/0096937 A1 * | 4/2009 | Bauer et al. | 348/739 |
| 2009/0112389 A1 * | 4/2009 | Yamamoto et al. | 701/29 |
| 2009/0160940 A1 * | 6/2009 | Imamura | 348/159 |
| 2009/0243824 A1 * | 10/2009 | Peterson et al. | 340/435 |

(Continued)

FOREIGN PATENT DOCUMENTS

JP 11-005501 A 1/1999

(Continued)

Primary Examiner — Imad Hussain
(74) Attorney, Agent, or Firm — Gifford, Krass, Sprinkle, Anderson & Citkowski, P.C.

(57) ABSTRACT

A motor vehicle with an integrated visual display system for displaying proximity location information on an external object while the motor vehicle is parked or moving is provided. The integrated visual display system is operable to display information from a plurality of proximity sensors on a single display screen. The plurality of proximity sensors can be part of an autonomous and/or cooperative collision warning system.

17 Claims, 6 Drawing Sheets

U.S. PATENT DOCUMENTS

| | | | |
|---|---|---|---|
| 2009/0326752 A1* | 12/2009 | Staempfle et al. | 701/29 |
| 2010/0098295 A1* | 4/2010 | Zhang et al. | 382/103 |
| 2010/0201816 A1* | 8/2010 | Lee et al. | 348/148 |

FOREIGN PATENT DOCUMENTS

| | | | |
|---|---|---|---|
| JP | 11099894 A * | 4/1999 | |
| JP | 2005-041398 A | 2/2005 | |
| JP | 2008-174076 A | 7/2008 | |
| KR | 20-0407699 Y1 | 2/2006 | |
| KR | 10-0775105 B1 | 11/2007 | |

* cited by examiner

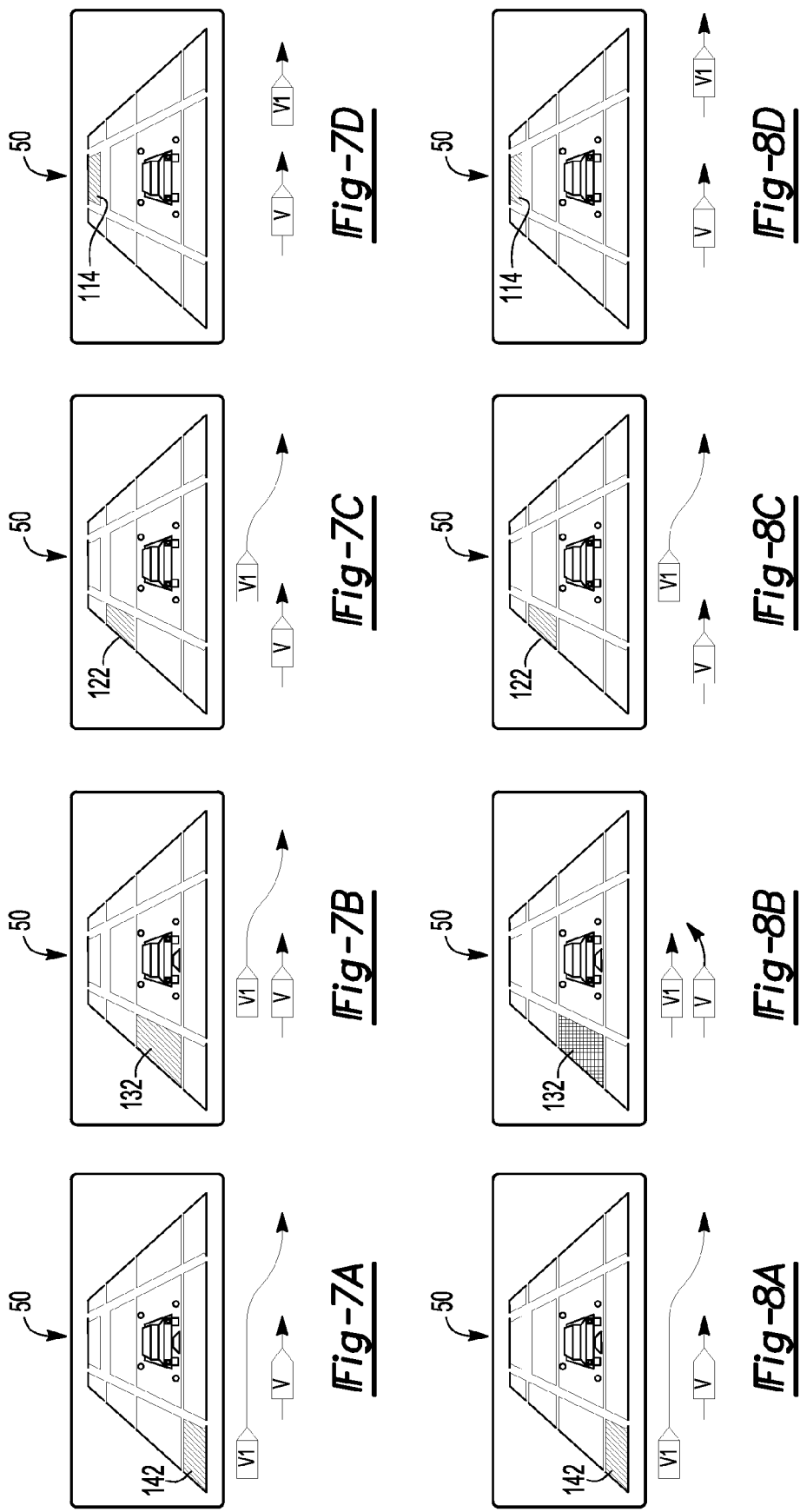

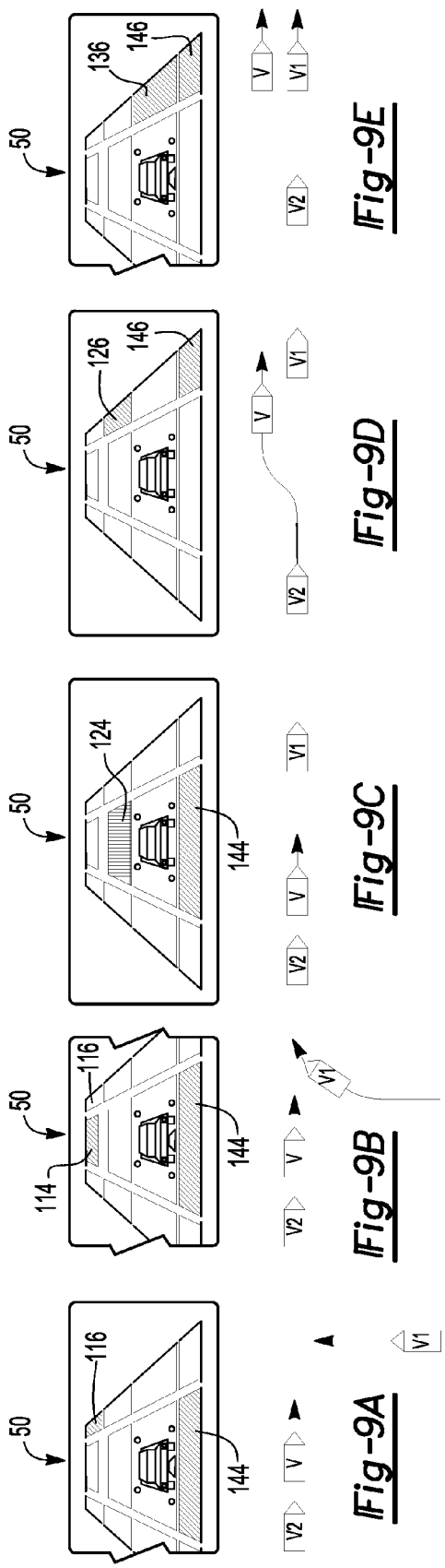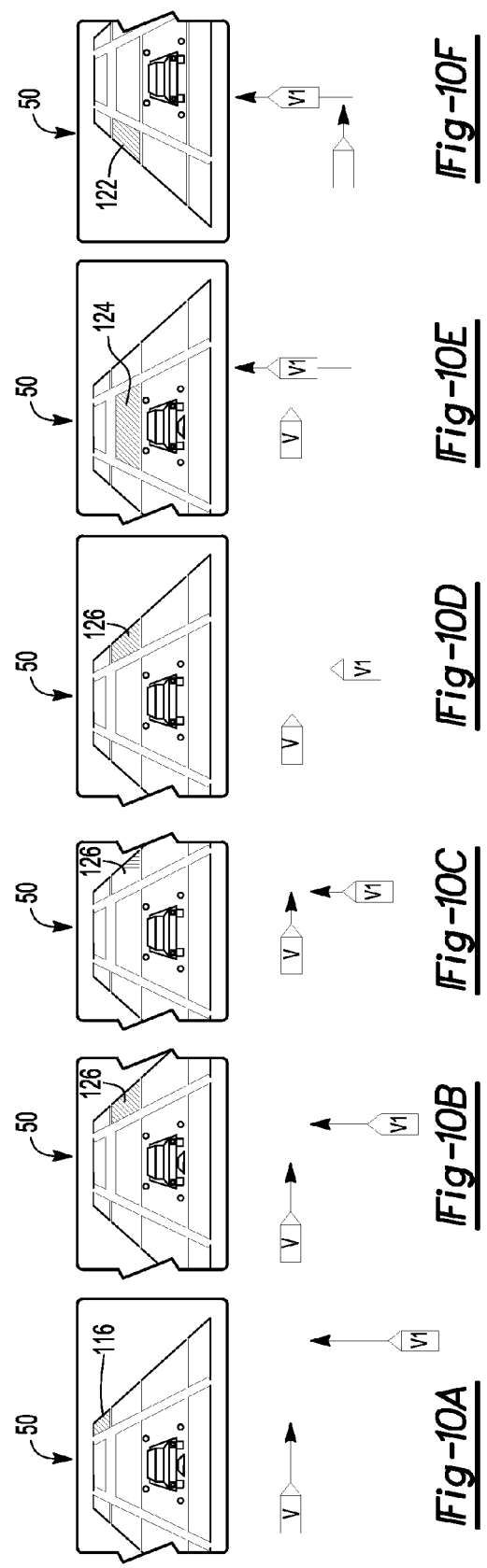

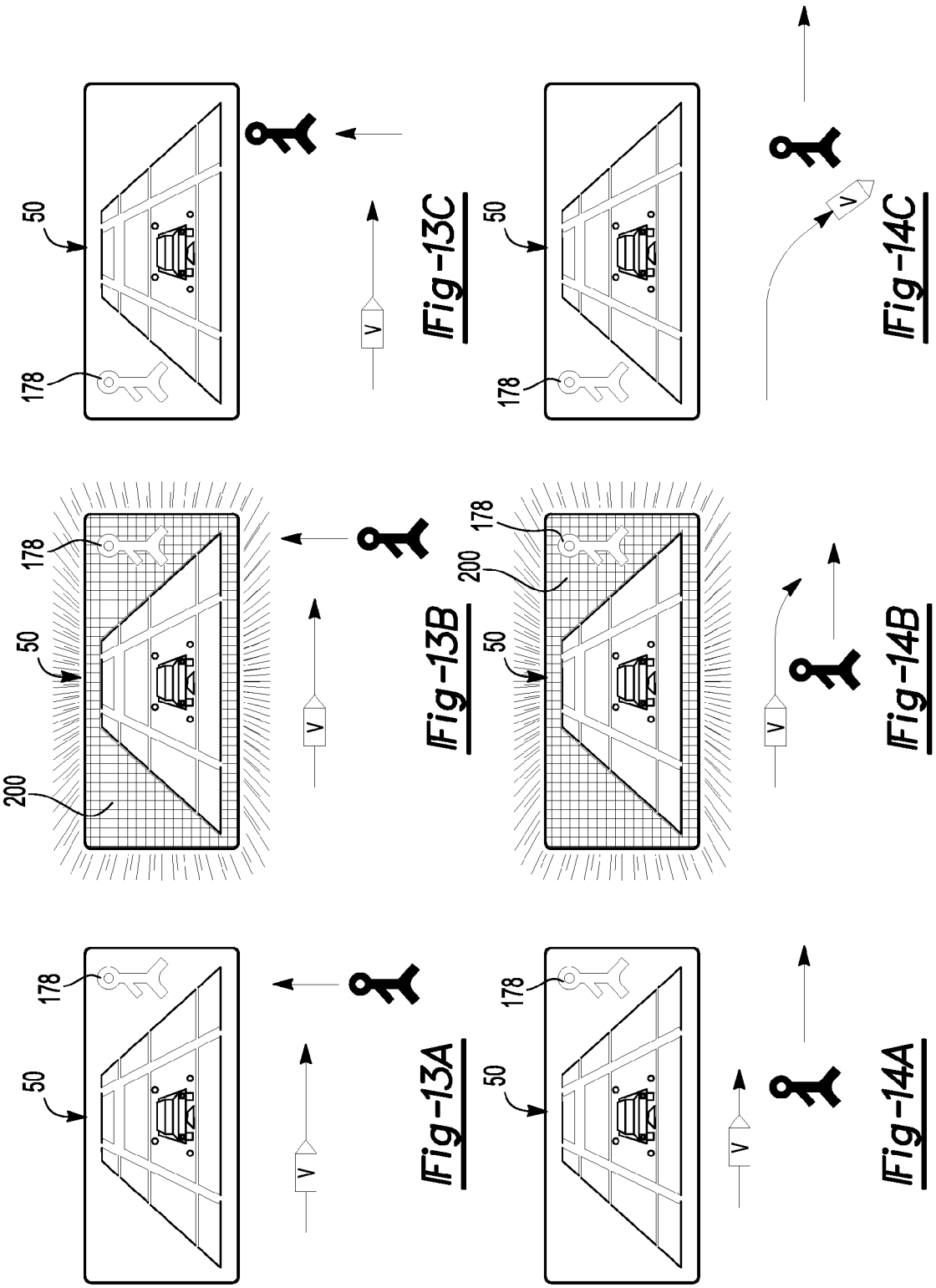

INTEGRATED VISUAL DISPLAY SYSTEM

FIELD OF THE INVENTION

The present invention is related to a visual display system for a motor vehicle. In particular, the invention is related to an integrated visual display system that displays proximity sensor information and/or collision warning information on a single display screen.

BACKGROUND OF THE INVENTION

Various visual display interfaces within motor vehicles are known. For example, display interfaces that provide a map, directions, and the like are common. In addition, some motor vehicles now include visual displays that provide information on the proximity of external objects in the vicinity of the motor vehicle. However, heretofore systems have been limited to autonomous systems wherein information displayed by the system is obtained solely from on-board sensors. Furthermore, such systems have typically displayed such information at different locations on a motor vehicle instrument panel.

Recent advancements in vehicle-to-vehicle and vehicle-to-infrastructure communication technologies, commonly known as cooperative systems, have further complicated the task of displaying external object proximity location information (EOPLI) due to the increased amount of information that is available to and must be processed by the driver of the motor vehicle. For example, communication-enabled cooperative systems can increase the complexity of information provided to the driver by detecting the existence of potential hazards up to 300 meters in front of the vehicle. As such, an integrated visual display system that can provide information from autonomous and cooperative systems onto an easily viewable and easy to understand single display would be desirable.

SUMMARY OF THE INVENTION

A motor vehicle with an integrated visual display system (IVDS) for displaying external object proximity location information (EOPLI) on a single display screen while the motor vehicle is parked or moving is provided. The system can include a motor vehicle with a plurality of proximity sensors that are operable to detect an object that is external or spaced apart from the motor vehicle. The IVDS is in electronic communication with at least part of the plurality of proximity sensors and the single display screen can include a plurality of grid sections thereon with an illumination source that is operable to illuminate one or more of the grid sections. The IVDS is operable to receive the proximity location information from at least part of the plurality of proximity sensors and illuminate one or more of the plurality of grid sections as a function of the location of one or more external objects.

The plurality of grid sections on the single display screen can be an x by y grid with y rows of x grid sections and x columns of y grid sections. The x and y can be an integer between 2 and 10. The x columns of y grid sections can visually represent lanes of a road or highway that the motor vehicle is traveling on and the y rows of x grid sections can visually represent a range of distances in front, beside and behind the motor vehicle. The single display screen can also have a symbol that is representative of the motor vehicle, the symbol being located on a reference grid section, the reference grid section being one of the plurality of grid sections. In some instances, at least one of the x columns can be located on a right side of the reference grid section and at least one of the x columns can be located on a left side of the grid section. In addition, at least one of the y rows can be located behind the reference grid section and at least one of the y rows can be located in front of the grid section. In some instances, x is equal to 3 and y is equal to 4, thereby affording a 3 by 4 grid section with 3 columns of 4 grid sections and 4 rows of 3 grid sections. In such an instance, the reference grid section can be located on a central column two of the 4 rows located in front of the reference grid section and 1 of the four rows located behind the reference grid section.

The single display screen can also have a left lane marker line on a left side of the reference grid section and a right lane marker line on a right side of the reference grid section. The IVDS is operable to illuminate the left lane marker line and/or the right lane marker line when at least one of the plurality of proximity sensors detects a left lane marker and/or a right lane marker, respectively, on a road or highway the motor vehicle is traveling on. In addition, the IVDS is also operable to illuminate the left lane marker line or the right lane marker line when the motor vehicle comes within a predetermined distance of the left lane marker line or right lane marker line, respectively, without having a turn signal on.

The plurality of proximity sensors can include a plurality of immediate vicinity sensors having a range of between 0 to 10 meters from the motor vehicle and a plurality of extended vicinity sensors having a range of between 10 to 300 meters from the motor vehicle. In addition, the plurality of proximity sensors can include at least one sensor from an autonomous external object proximity location system and at least one sensor from a cooperative external object proximity location system. The external object can be another motor vehicle, a pedestrian, a traffic signal, a lane marker on a road or highway, and the like.

BRIEF DESCRIPTION OF THE DRAWINGS

FIG. 7 is the embodiment of FIG. 2 illustrating the IVDS displaying another motor vehicle passing the original motor vehicle;

FIG. 8 is the embodiment of FIG. 2 illustrating the IVDS displaying a collision threat when the original vehicle attempts to turn into the lane of another motor vehicle;

FIG. 9 is the embodiment of FIG. 2 illustrating the IVDS displaying another motor vehicle turning in front of the original motor vehicle;

FIG. 10 is the embodiment of FIG. 2 illustrating the IVDS displaying the original motor vehicle and another motor vehicle approaching an intersection from different directions;

FIG. 13 is the embodiment of FIG. 2 illustrating the IVDS displaying the original motor vehicle approaching a pedestrian crossing in front of the original motor vehicle; and FIG. 14 is the embodiment of FIG. 2 illustrating the IVDS displaying the original motor vehicle turning into the path of a walking pedestrian.

DETAILED DESCRIPTION OF THE INVENTION

Figure 1:
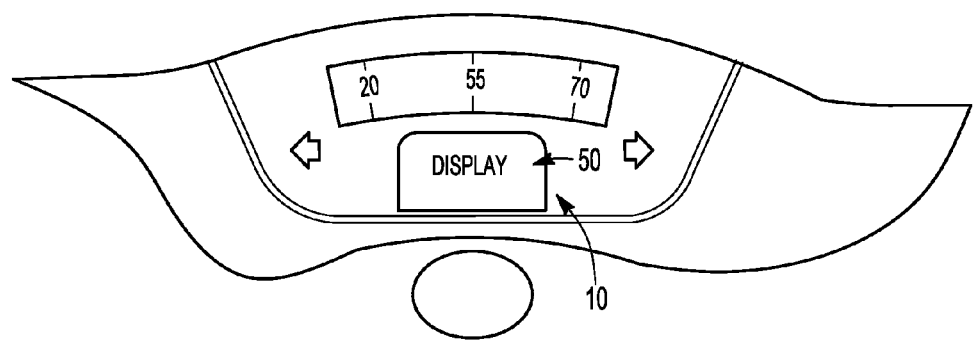
FIG. 1 illustrates an instrument panel with an integrated visual display system (IVDS) according to an embodiment of the present invention.

The present invention discloses an integrated visual display system (IVDS) for a motor vehicle that integrates proximity location information of an external object onto one single display screen. As such, the IVDS has utility as a safety feature for a motor vehicle.

The IVDS can include a plurality of proximity sensors that are operable to detect an external object. It is appreciated that the IVDS and the plurality of proximity sensors are located and/or attached on/within a motor vehicle. In addition, for the purposes of the present invention an external object can be another motor vehicle, a lane marker on the road or highway that the motor vehicle is traveling on, a pedestrian, a traffic signal, a STOP sign, a speed limit sign, other traffic signs, infrastructure objects, and the like.

The IVDS can also include a single visual display screen that is located in a driver's line of sight when the driver is seated in a driver seat of the motor vehicle. The single display screen is in electronic communication with at least part of the plurality of proximity sensors and can have a plurality of grid sections thereon with an illumination source. The illumination source can illuminate one or more of the plurality of grid sections.

In addition, the IVDS is operable to receive external object proximity location information (EOPLI) from at least part of the plurality of proximity sensors and illuminate one or more of the plurality of grid sections on the single display screen as a function of where the external object is located relative the motor vehicle having the IVDS, hereafter referred to as the "original motor vehicle" or "original vehicle". For example, if the original motor vehicle is traveling on a road or highway, and another vehicle approaches from the rear, the IVDS can illuminate a grid section on the single display screen that alerts the driver that the other motor vehicle is approaching from behind. Likewise, the IVDS can illuminate grid sections on the single display screen in order to show the driver the location(s) of more than one vehicle in the original vehicle's vicinity.

If a cooperative system is engaged with the IVDS, the location of other external objects such as traffic signals, infrastructure objects, in addition to other motor vehicles, can be displayed to the driver. For example and for illustrative purposes only, if the original motor vehicle is approaching a "red light" at too high a rate of speed, the single display screen can alert the driver of a collision threat.

The plurality of grid sections on the single display screen can be an x by y grid with y rows of x grid sections and x columns of y grid sections. The x and the y can each be an integer between 2 and 10. The x columns of the y grid sections are arranged such that they visually represent lanes of a road or highway that the motor vehicle could be traveling on. In addition, the y rows of x grid sections are arranged such that they visually represent a range of distances in front, beside and behind the motor vehicle.

The single display screen can also include a symbol that is representative of the original motor vehicle, the symbol being located on a reference grid section that is one of the plurality of grid sections. In this manner, the other grid sections of the x by y grid represent areas surrounding the original motor vehicle. In some instances, at least one of the x columns is located on a right side of the reference grid section and at least one of the x columns is located on a left side of the reference grid section. As such, the columns on the right side and the left side of the reference grid section represent different lanes of a road or highway that could be present when the motor vehicle is traveling thereon. At least one of the y rows is located behind the reference grid section and at least one of the y rows is located in front of the reference grid section. In this manner, the rows of grid section represent areas behind and in front of the original motor vehicle. One or more of the grid sections can be illuminated in one or more colors by the illumination source.

In some instances, the x is equal to 3 and the y is equal to 4. In these instances, the reference grid section can be located on a central column of grid sections, one of the three columns can be located on a left side of the reference grid section and one of the three columns can be located on a right side of the reference grid section. In addition, the reference grid section can be located on one of the rows of grid sections with one of the four rows located behind the reference grid section and two of the four rows located in front of the reference grid section.

The single display screen can also include a left lane marker line on a left side of the reference grid section and a right lane marker line on a right side of the reference grid section. The left lane marker line and the right lane marker line can be illuminated in one or more colors by the illumination source. For example, the left lane marker line can be illuminated in a first color when at least one of the plurality of proximity sensors detects a left lane marker and the right lane marker line can be illuminated in the first color when at least one of the plurality of proximity sensors detects a right lane marker on the road or highway the original motor vehicle is traveling on. In addition, the IVDS is operable to illuminate either the left lane marker line or the right lane marker line a second color when the motor vehicle comes within a predetermined distance of the left lane marker or the right lane marker, respectively, without having a turn signal on. In this manner, a driver of the original motor vehicle can be alerted when veering too close to a lane marker that is on the left side or the right side of the vehicle. In some instances, the first color can be white and the second color can be red, however this is not required.

The left lane marker line on the display screen can be between the column that the reference grid section is located on and the column of grid sections on the left side of the reference grid section. Likewise, the right lane marker line can be between the column that the reference grid section is located on and the column of grid sections on the right side of the reference grid section.

The plurality of proximity sensors can include immediate vicinity sensors having a range of between 0 to 10 meters from the motor vehicle and extended vicinity sensors having a range of between 10 to 300 meters from the motor vehicle. In addition, the plurality of proximity sensors can include at least one sensor from an autonomous external object proximity location system and at least one sensor from a cooperative external object proximity location system. For the purposes of the present invention, an autonomous external object proximity location system refers to a system that can detect and/or locate an external object using sensors that are completely on board the vehicle. In addition, a cooperative external object proximity location system is known as a system that can communicate with other vehicle and/or infrastructure systems in order to determine the proximity and/or location of an external object. Such types of proximity sensors and EOPLI systems include, but are not limited to the following.

Autonomous Systems

A park assist system typically includes 4 to 6 ultrasonic sensors that are installed on bumper surfaces to detect obstacles around the vehicle. The system works at a relatively slow motor vehicle speed range, for example less than 16 kilometers per hour (kph) (less than 10 miles per hour (mph)). The detection range is usually within 3 meters (9.8 feet). When an obstacle such as another parked car or barrier in a parking lot is located in the immediate vicinity of the original vehicle, the park assist system alerts the driver of the existence of the obstacle by illuminating a dot near a vehicle icon on the instrument panel and activating a beeping sound in order to assist a driver in avoiding a collision.

A forward collision warning system can include a forward-looking sensor that detects an obstacle in the front of the vehicle and warns the driver if a rear end collision into the obstacle is predicted. There forward-looking sensor can include a 77 GHz radar, 24 GHz radar, laser scanner, and/or camera that can detect the existence, location and movement of obstacles in front of the original motor vehicle.

A blind spot warning system can be similar to the forward collision warning system but the obstacles are detected in the blind spot zones, e.g. rear right and rear left, of the original motor vehicle. A 24 ZGHz radar and/or camera can be used to detect other vehicles in a blind spot. The blind spot warning system can also determine a collision risk with the obstacle and warn the driver accordingly.

A lane departure warning system can use a forward-looking camera to detect the lane markings on a road or highway that the original motor vehicle is traveling on. Based on a current status of the original vehicle, e.g. its speed and heading, and its relationship with the lane markings defined by the camera, the system determines the possibility of the vehicle to depart its own lane and warns the driver if necessary.

Cooperative Systems

Dedicated short range communication (DSRC) using 5.9 GHz sensors can be used to exchange vehicle-related information among other vehicles as well as with infrastructure systems.

An emergency electronic brake light system can assist drivers that can not see ahead of a motor that is directly in front of them. For example, assume there are three cars driving in the same lane and the same direction. The driver of the rearward most vehicle cannot see the rear of the forward most vehicle because the view is blocked by the center vehicle. When the brakes of the forward most vehicle are suddenly applied, information related to the sudden braking and other vehicle data (such as speed, location and heading) can be transmitted wirelessly to the rearward most vehicle such that the driver of the rearward most vehicle can react to the braking of the forward most vehicle prior to actually seeing the brake lights of the center vehicle. In this manner, the system can aid in reducing the risk of the rearward most vehicle colliding into preceding vehicles.

A straight cross path warning system can assist drivers when two cars are approaching an intersection at different directions. Conventional on-board sensors such as radar, laser or camera on the original vehicle typically do not detect another vehicle on a road that is approaching an intersection at a different direction since the on-board sensors are aimed to detect obstacles in front and/or behind the original vehicle. Thus the other vehicle approaching the intersection is outside of the detection range/angle of the on-board sensors. When a wireless communication between two vehicles is available, each vehicle can detect the existence and movement of the other vehicle. When a collision risk is predicted, the straight cross path system can warn the driver.

A blind spot warning system for a cooperative system is similar to the autonomous system version previously described. However, if a cooperative system affords for wireless detection of the existence and movement of another vehicle. In addition, since a 5.9 GHz DSRC communication sensor is omni-directional and has a 300 meter (984 feet) communication range, the cooperative blind spot warning system can detect the other vehicle at a greater distance and at any angle when compared to the autonomous system.

A traffic signal violation warning system can warn a driver of a potential signal violation when a roadside system transmits a map of an intersection and information about a traffic signal, e.g. the current color of the signal and when it will change to another color. An original vehicle can then receive the information and compare it with its current status, e.g. location and speed, and calculate the potential of violating a red signal. When a violation is predicted, the driver can be alerted.

Turning now to FIG. 1, an illustration of an instrument panel within a motor vehicle is shown with an IVDS 10. It is appreciated that the system includes and/or can be in communication with a plurality of proximity sensors (not shown) that are part of and/or attached to the original motor vehicle. As shown in this figure, it is appreciated that the IVDS 10 can have a single display screen 50 that is in a line-of-site of a driver sitting in a driver's seat of the original vehicle.

Figure 2:
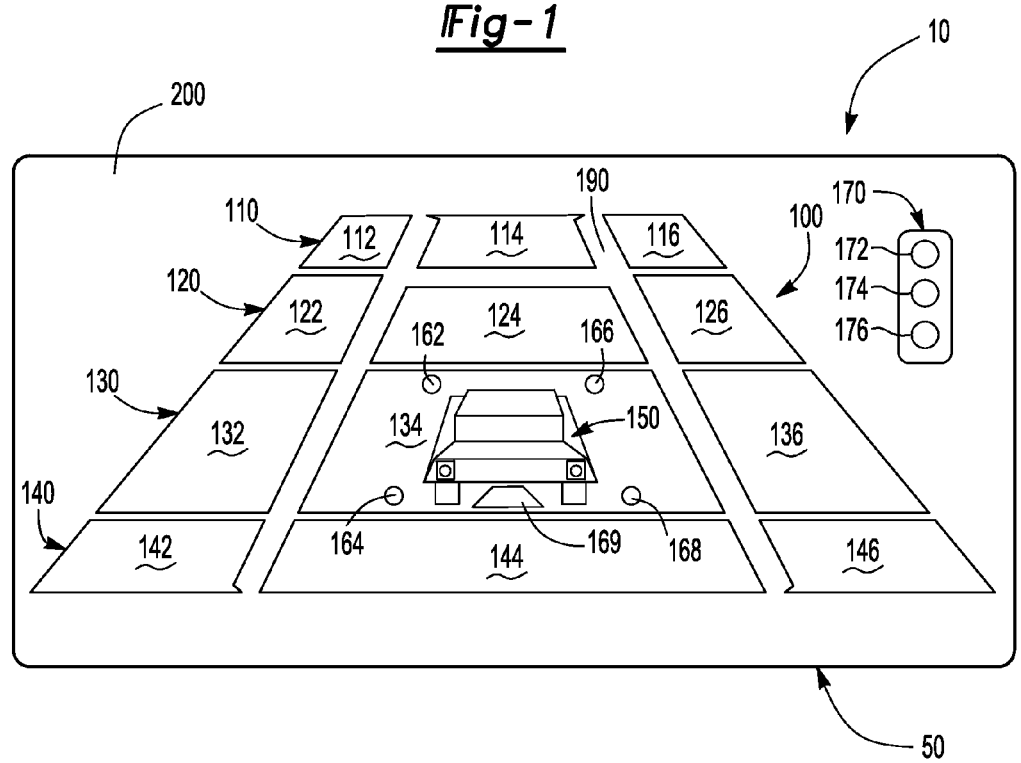
FIG. 2 is an embodiment of an IVDS showing a plurality of grid sections, a symbol representing a motor vehicle on a reference grid section and a symbol representing a traffic signal.

Turning now to FIG. 2, an enlarged view of the single display screen 50 is shown. The display screen 50 can include a symbol 150 that is representative of the original motor vehicle, the symbol 150 located on a reference grid section 134. In addition, the display 50 can include a plurality of grid sections that surround the symbol 150 and/or reference grid section 134. As shown in FIG. 2, the plurality of grid sections can be a 3 by 4 grid having 3 columns of 4 grid sections and 4 rows of 3 grid sections. However, other grids are possible, for example an x by y grid where x and y are equal to an integer between 2 and 10, inclusive. In the example shown in FIG. 2, two rows of grid sections, in particular row 110 and row 120, are located in front of the symbol 150 and one row 140 is located behind the symbol 150. It is appreciated that the symbol 150 is located on a row 130. It is further appreciated that 1 column of 4 grid sections is located on a left side of the symbol 150 and 1 column of 4 grid sections is located on a right side of the symbol 150. In addition, the symbol 150 is located on a center column of 4 grid sections.

For illustrative purposes only, the grid sections are labeled with a grid section 112 being the furthest front left grid section and a grid section 116 being the furthest front right grid section relative to the symbol 150 and/or reference grid section 134. Between the row 130 upon which the symbol 150 is located and the forwardmost row 110 is an intermediate row 120. It is appreciated that this row of grid sections represents distances between the symbol 150 and the front row 110 of grid sections.

Located between the reference grid section 134 and the column of grid sections to the left of the symbol 150 can be a left lane marker line 180. Likewise, located between the reference grid section 134 and the column of grid sections to its right can be a right lane marker line 190. In addition to the plurality of grid sections located around the symbol 150, an object 170 may or may not be displayed on the single display screen 50. As illustrated in FIG. 2, the external object 170 can be a traffic signal, however, other external objects can be displayed on the display screen 50, for example a symbol representing a pedestrian, a STOP sign, and the like.

During operation, the original motor vehicle can be parked or moving along a road or highway with the plurality of proximity sensors detecting and/or gathering information regarding the external surroundings/environment of the original motor vehicle. As such, if another motor vehicle comes within the vicinity of the original motor vehicle, its location can be shown on the display 50 by illuminating one of the grid sections. For example and for illustrative purposes only, if a motor vehicle is in front of the original motor vehicle by a distance of between 150 to 300 meters, then the IVDS 10 is operable to illuminate grid section 112, 114 or 116 depending upon whether the other vehicle is located to the left, directly in front or to the right, respectively, of the original motor vehicle. Likewise, if a motor vehicle is detected within a range of 10 to 150 meters (33 to 492 feet) in front of the original motor vehicle, then the grid section 122, 124 or 126 is illuminated depending upon whether the other motor vehicle is located to the left, directly in front or to the right, respectively, of the original motor vehicle. If the other motor vehicle is located directly beside the original motor vehicle, for example in the next lane, then the grid section 132 or 136 can be illuminated. And finally, if another motor vehicle is located between 10 to 300 meters behind the original motor vehicle, then the grid sections 142, 144 or 146 can be illuminated depending upon whether the other motor vehicle is located to the left, directly behind or to the right of the original motor vehicle.

Figures 3A, 3B, 3C:
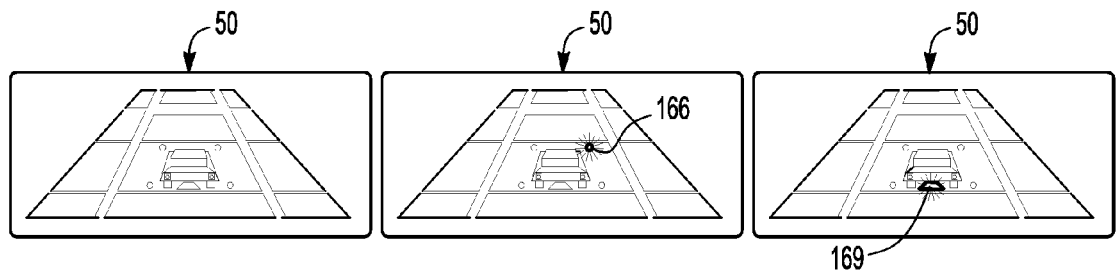
FIG. 3 is the embodiment of FIG. 2 illustrating the IVDS displaying detection of an external object in the immediate vicinity of the motor vehicle.
Figure 4A:
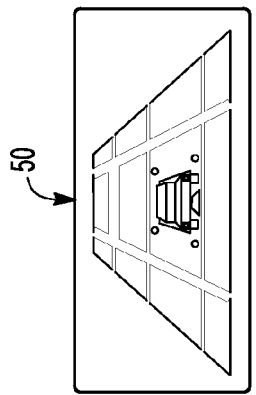
FIG. 4 is the embodiment of FIG. 2 illustrating the IVDS displaying the recognition of lane markers on a road or highway.
Figure 4B:
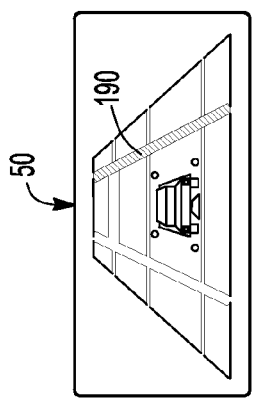
Figure 4C:
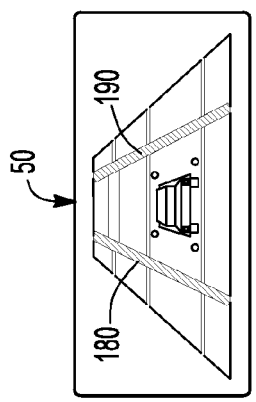
Figure 4D:
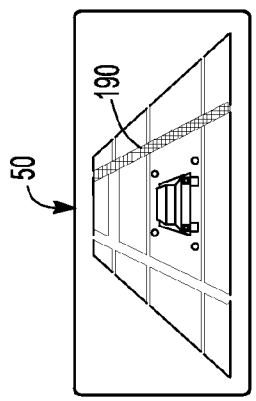

In addition to the plurality of grid sections on the single display screen 50, the integrated visual display system 10 can include immediate vicinity signals that can be seen by the driver of the motor vehicle. For example, signals 162, 164, 166, 168 and 169 as illustrated in FIG. 2 provide information to the driver regarding other parked motor vehicles, children in the immediate vicinity, pets in the immediate vicinity and the like when the car is parked. Illustrating such use of the immediate vicinity signals is shown in FIG. 3 where FIG. 3A illustrates the original motor vehicle with no surrounding external objects, FIG. 3B illustrates the original motor vehicle with an external object located on the front right side of the vehicle, and FIG. 3C illustrates an external object located directly behind the motor vehicle. It is appreciated that FIG. 3A represents the single display screen 50 without any illumination, or in the alternative, with standard background color(s). In this manner, when the motor vehicle is parked or traveling at a very slow rate of speed, for example less than 16 kph (10 mph), the driver can glance at a single display screen 50 and determine the immediate surroundings of the vehicle.

Turning now to FIGS. 4-6, illustration of the plurality of grid sections being illuminated depending upon various external object location scenarios is shown. For example and for illustrative purposes only, FIG. 4A illustrates the original motor vehicle just entering onto a road or highway with no external objects in the vicinity. Then, FIG. 4B illustrates that at least one of the plurality of proximity sensors on the original motor vehicle has detected a lane marker on the right side of the vehicle and the IVDS 10 has illuminated the right road marker line 190 a first color represented by the slash lines on the line 190. Assuming that the road or highway also has a lane marker on the left side of the original motor vehicle, FIG. 4C illustrates that at least one of the proximity sensors on the motor vehicle has detected the lane marker and the IVDS 10 has illuminated the left lane marker line 180 the first color. Looking specifically at FIG. 4D, the right lane marker line 190 is illuminated a second color represented by the cross-hatch lines on the line 190 and illustrates that the original motor vehicle has veered over to the lane marker located on the right side of the vehicle beyond a predetermined distance without having a turn signal on. It is appreciated that when the IVDS 10 can afford for illuminating the left lane marker line 180 and/or the right lane marker line 190 in the first color, the second color or other colors. In some instances, the first color can be white and the second color can be red, however this is not required. In addition, the background 200, the plurality of grid sections 100, the lane marker lines 180, 190, etc., can have a background color such as grey, green, etc.

Figure 5A:
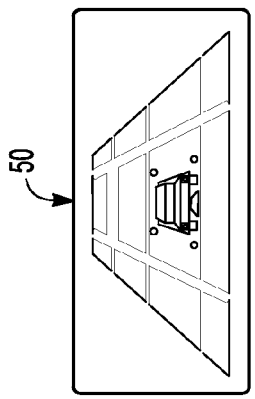
FIG. 5 is the embodiment of FIG. 2 illustrating the IVDS displaying a collision threat in front of the motor vehicle.
Figure 5B:
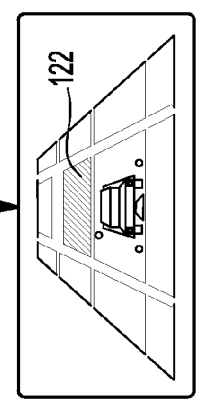
Figure 5C:
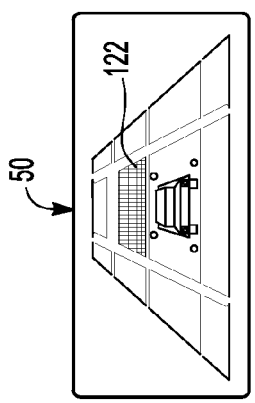
Figure 5D:
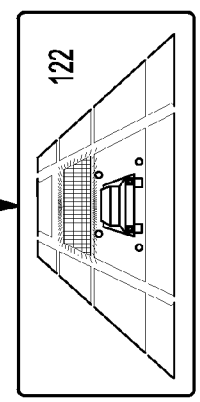

Looking specifically at FIG. 5, FIG. 5A illustrates the original motor vehicle traveling on a road with no other motor vehicles in its vicinity. In contrast, FIG. 5B shows grid section 122 illuminated in the first color, thereby illustrating that another motor vehicle or some other external object is located directly in front of the original motor vehicle at a distance between 10 to 150 meters. If the original motor vehicle continues to approach the external object directly in front thereof without adequately slowing down, then the IVDS 10 affords for the grid section 122 to be illuminated in the second color. It is appreciated that the change in color of the grid section 122 can alert the driver of a possible collision. Looking specifically at FIG. 5D, if the driver continues to approach the external object without appropriately slowing down, the grid section 122 can be illuminated in the second color and blink on and off as represented by the short lines extending away from the grid section. It is further appreciated that an audio signal could also be provided to the driver under such a circumstance. In this manner, a collision hazard can be communicated to the driver.

Figure 6A:
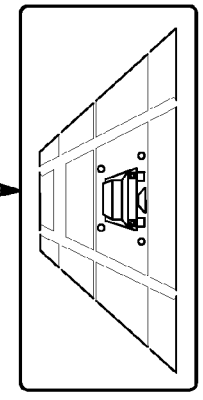
FIG. 6 is the embodiment of FIG. 2 illustrating the IVDS displaying the presence of other motor vehicles in the vicinity of the motor vehicle.
Figure 6B:
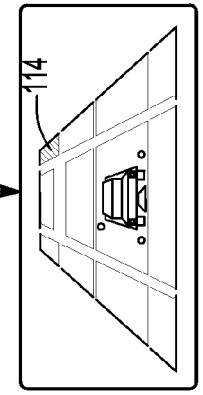
Figure 6C:
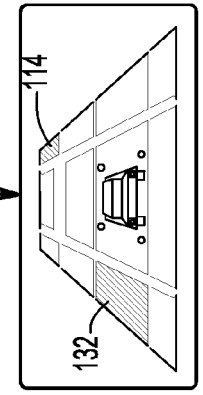
Figure 11D:
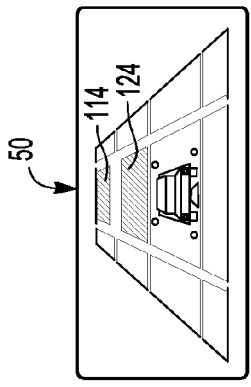
FIG. 11 is the embodiment of FIG. 2 illustrating the IVDS displaying a collision warning from another vehicle that is located two vehicles in front of the original motor vehicle.
Figure 11C:
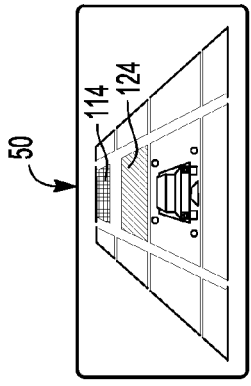
Figure 11B:
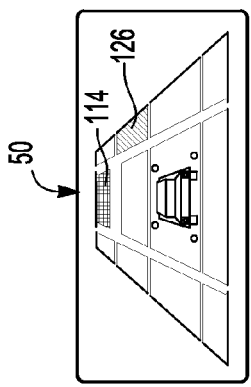
Figure 11A:
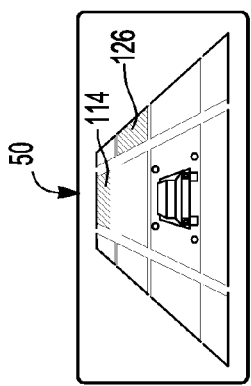
Figure 12D:
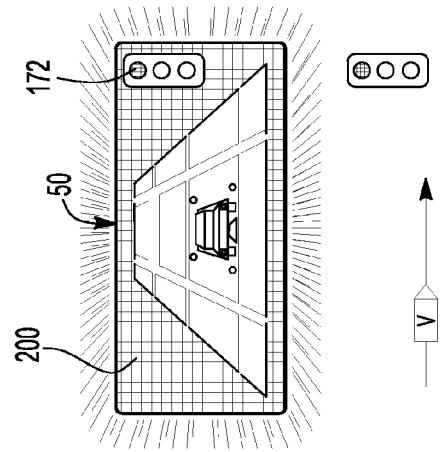
FIG. 12 is the embodiment of FIG. 2 illustrating the IVDS displaying the original motor vehicle approaching a traffic signal.
Figure 12C:
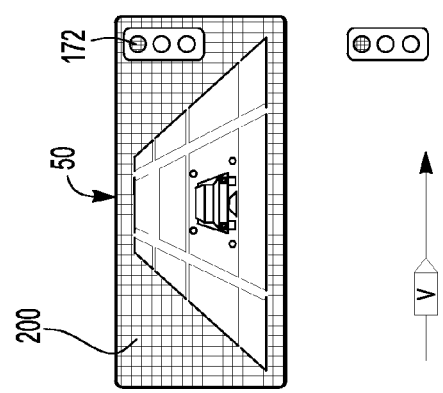
Figure 12B:
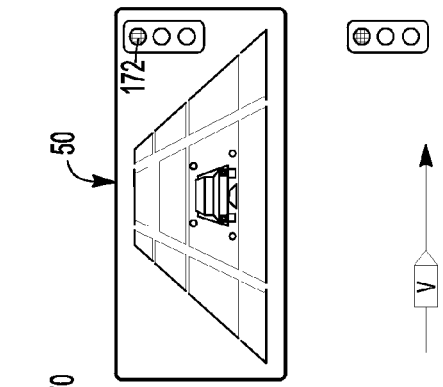
Figure 12A:
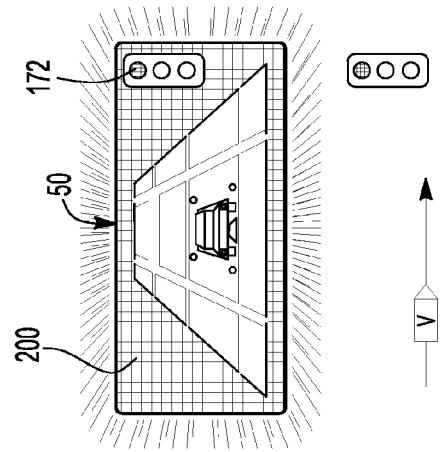

Looking now at FIG. 6, FIG. 6A illustrates the original motor vehicle traveling along a road or highway with no external objects in its vicinity. Then, FIG. 6B illustrates that an external object, for example another motor vehicle, is located in front of the original motor vehicle, e.g. at a distance between 150 to 300 meters (492 to 984 feet) and off to the right side as represented by the illumination of grid section 114. FIG. 6C illustrates that another motor vehicle has approached the original motor vehicle and is located directly beside the motor vehicle, e.g. within a distance of 2 to 10 meters (7 to 33 feet), as shown illustrated by the illumination of the grid section 132.

Various scenarios of other motor vehicles in the vicinity of the original motor vehicle are shown in FIGS. 4-14. It is appreciated that these figures are not meant to limit the invention in any way and are provided for illustrative purposes only.

Looking specifically at FIG. 7, FIGS. 7A-7D illustrate another motor vehicle V1 approaching the original motor vehicle V from the left rear and eventually passing the vehicle V and pulling into its lane. As shown in FIG. 7A, when the vehicle V1 is located on the left rear portion of the vehicle V, the grid section 142 is illuminated. As the vehicle V1 pulls up beside the vehicle V the grid section 142 is de-illuminated and the grid section 132 is illuminated. Thereafter, as the vehicle V1 passes beyond the vehicle V, grid section 132 is de-illuminated and grid section 122 is illuminated. And finally, when the vehicle V1 moves from the lane that is to the left of the vehicle V into the same lane that vehicle V is driving, grid section 122 is de-illuminated and grid section 114 is illuminated. In this manner, the IVDS 10 provides the driver of the original motor vehicle V with proximity information on the vehicle V1 as it approaches and eventually passes.

Turning now to FIG. 8, FIGS. 8A-8D illustrate the original motor vehicle V attempting to turn into the path of the other motor vehicle V1 that is passing the vehicle V. As shown in FIG. 8A, as the vehicle V1 approaches the vehicle V from the left rear, grid section 142 is illuminated. However, as the vehicle V1 pulls alongside the vehicle V and the vehicle V attempts to move over into the left lane, the grid section 132 is illuminated in the second color. In this manner, the driver of the vehicle V is alerted that a collision is possible. After the vehicle V reverses its preliminary move or movement over to the left lane, and the vehicle V1 passes the vehicle V, grid section 122 is illuminated while the grid section 132 is de-illuminated. And finally, as the vehicle V1 moves over into the lane that vehicle V is traveling on, the grid section 122 is de-illuminated and the grid section 114 is illuminated.

Turning to FIG. 9, FIGS. 9A-9E illustrate a potential collision hazard from a motor vehicle that has pulled in front of the original motor vehicle V. Looking specifically at FIG. 9A, the single display screen 50 illustrates that a vehicle V2 is located directly behind the original vehicle V by the illumination of grid section 144 and another vehicle V1 is approaching the vehicle V from the right by the illumination of grid section 116. Thereafter, the vehicle V1 turns right and pulls in front of the vehicle V as illustrated by the illumination of grid section 114. In the event that the vehicle V1 is traveling too slow or that the vehicle V does not adequately slow down when vehicle V1 pulls in front, the grid section 124 is illuminated in the second color. In this manner, the driver of the vehicle V is alerted that he or she is approaching the vehicle V1 in an unsafe manner and a collision is possible. FIGS. 9D and 9E illustrate that the original motor vehicle V has moved over to the left lane and is passing the vehicle V1 which is shown by the illumination of grid sections 146 and 126, and then grid sections 146 and 136.

Turning now to FIG. 10, FIGS. 10A-10F illustrate the original motor vehicle V and the other motor vehicle V1 approaching an intersection from different directions. As shown in FIG. 10A, the grid section 116 is illuminated as the vehicle V1 and vehicle V approach the same intersection. Assuming the vehicles continue to approach the intersection, FIG. 10B illustrates the two vehicles moving closer to each other with the illumination of grid section 126. Assuming the driver does not adequately reduce the speed of the vehicle V, FIG. 10C illustrates a collision warning to the driver with the illumination of grid 126 in the second color. Thereafter assuming that the vehicle V stops and/or that the vehicle V1 stops, the grid section 126 changes its illumination color from the second color back to the first color. After the vehicle V1 passes in front of the vehicle V grid section 122 is illuminated as shown in FIG. 10F.

Turning now to FIG. 11, a potential collision hazard resulting from a vehicle that is "two cars ahead" of the original motor vehicle V is shown. Looking particularly at FIG. 11A, two vehicles V1 and V2 are traveling in front of vehicle V. This is shown on the display 50 by the illumination of grid sections 114 and 124. In the event that the most forward vehicle V1 stops suddenly, the integrated visual display system 10 alerts the driver of the vehicle V of the sudden stop by changing the illumination color of grid section 114 from the first color to the second color. In this manner, the driver of the vehicle V is alerted in advance of seeing the brake lights of the vehicle V2 that a collision hazard is present. FIGS. 11C and 11D illustrate that the vehicle V2 has pulled over to the right in order to pass the vehicle V1 as represented by the grid section 126 being illuminated.

Regarding the IVDS 10 providing information to the driver of the motor vehicle with respect to traffic lights, pedestrians and the like, FIG. 12 shows an example of the original motor vehicle V approaching a traffic signal. In particular, FIG. 12A shows a traffic signal 170 on the single display screen 50, the signal 170 having lights 172, 174 and 176. When the actual traffic signal is "green", the light 176 is illuminated as shown in the figure. In the event that the traffic signal changes from green to red, this information can be provided to the driver by the de-illumination of light 176 and illumination of light 172. It is appreciated that the lights 172, 174 and 176 can be illuminated in a red, yellow and green color, respectively. In this manner, if the motor vehicle V is traveling behind a large object such as a tractor-trailer truck and cannot see the traffic signal, it is alerted as to whether or not it is green, yellow or red. In the event that the original motor vehicle V approaches the traffic signal when it is red at too high a rate of speed, in addition to the light 172 being illuminated on the display 50, the background 200 can be illuminated. If the vehicle continues to approach the traffic signal at too great a rate of speed, the background 200 can be illuminated and also blink. It is appreciated that audio signals can also be provided to the driver when such a hazard exists.

Turning now to FIG. 13, a situation where a pedestrian is walking in front of the original motor vehicle V is shown. As the pedestrian approaches the path of the vehicle V, the symbol 178 can appear on the display screen 50. If the pedestrian comes within a predetermined distance of the vehicle V, the background 200 can be illuminated, for example in red. Assuming the vehicle V slows down or stops, and the pedestrian walks in front of the vehicle V, thereafter the pedestrian symbol 178 is shown on the left side of the plurality of grid sections 100.

Looking specifically at FIG. 14, an example of the original vehicle V attempts to make a right turn and upon doing so comes within a predetermined distance of the pedestrian is shown. As illustrated in FIG. 14A, the pedestrian symbol 178 is presented to the driver on the single display screen 50 and as the vehicle V attempts to make a right turn as shown in FIG. 14B, the background 200 is illuminated, for example in red. In addition, the background 200 can be illuminated and blink on and off. This alerts the driver to slow down or stop, thereby allowing the pedestrian to walk in front of the vehicle V after which the vehicle V can proceed. In this manner, the IVDS 10 provides external object proximity location information to the driver and affords for the driver to change the direction and/or speed of the motor vehicle and thus avoid a potential collision.

It is appreciated that the display screen 50 is an LCD display screen, however this is not required. Other types of display screens can be used including those not yet available, since the scope of the invention is related to providing external object proximity location information to a driver on a single screen. As such, any display screen falls within the scope of the present invention. The IVDS 10 a system can integrate autonomous systems and cooperative systems such that potential collision hazards from external objects up to 300 meters (984 feet) in distance from the motor vehicle can be avoided. It is appreciated that the distance values are proximate and can vary from the actual values that are listed.

Thus, the invention is not restricted to the illustrative examples described above. The examples are not intended as limitations on the scope of the invention. Methods, apparatus and the like described herein are exemplary and not intended as limitations on the scope of the invention. Changes therein and other uses will occur to those skilled in the art. The scope of the invention is defined by the scope of the claims.

I claim:

1. A motor vehicle with an integrated visual display system for displaying proximity location information on an external object while the motor vehicle is parked or moving, the integrated visual display system operable to display the proximity location information of the external object on a single screen within the motor vehicle, said motor vehicle comprising:
- a plurality of proximity sensors operable to detect an external object;
- a visual display located in a driver's line of sight when the driver is seated in a driver's seat of said motor vehicle, said visual display in electronic communication with said plurality of proximity sensors and having:
- a single display screen with a plurality of grid sections, said plurality of grid sections having a reference grid section with a symbol representing the motor vehicle and grid sections located behind, in front and on both sides of said reference grid section, wherein said plurality of grid sections is an x by y grid with y rows of x grid sections and x columns of y grid sections, said x and said y each being an integer between 2 and 10;
- an illumination source, said illumination source operable to illuminate one or more of said plurality of grid sections;
- said visual display operable to receive the proximity location information from at least part of the plurality of proximity sensors and illuminate one or more of said plurality of grid sections as a function of the proximity location information.

2. The motor vehicle of claim 1, wherein said x columns of y grid sections visually represent lanes of a road or highway said motor vehicle is traveling on.

3. The motor vehicle of claim 1, wherein said y rows of x grid sections visually represent a range of distances in front, beside and behind said motor vehicle.

4. The motor vehicle of claim 3, wherein at least one of said x columns is located on a right side of said reference grid section and at least one of said x columns is located on a left side of said reference grid section.

5. The motor vehicle of claim 4, wherein at least one of said y rows is located behind said reference grid section and at least one of said y rows is located in front of said reference grid section.

6. The motor vehicle of claim 5, wherein at least two of said y rows are located in front of said reference grid section.

7. The motor vehicle of claim 1, wherein said x is equal to 3 and said y is equal to 4.

8. The motor vehicle of claim 7, wherein one of said 3 columns is located on a left side of said reference grid section one of said 3 columns is located on a right side of reference grid section.

9. The motor vehicle of claim 7, wherein one of said 4 rows is located behind said reference grid section and two of said 4 rows is located in front of said reference grid section.

10. The motor vehicle of claim 1, further comprising a left lane marker line on a left side of said reference grid section and a right lane marker line on a right side of said reference grid section.

11. The motor vehicle of claim 10, wherein said visual display is operable to illuminate said left lane marker line and said right lane marker line.

12. The motor vehicle of claim 11, wherein said left lane marker line is illuminated when at least one of said plurality of proximity sensors detects a lane marker on a left side of said motor vehicle and said right lane marker line is illuminated when at least one of said plurality of proximity sensors detects a lane marker on a right side of said motor vehicle.

13. The motor vehicle of claim 11, wherein said visual display is operable to illuminate said left lane marker line or said right lane marker line when said motor vehicle comes within a predetermined distance of said left lane marker or said right lane marker, respectively, without having a turn signal on.

14. The motor vehicle of claim 10, wherein said left lane marker line is located between a column of grid sections that said reference grid section is located on an adjacent column of grid sections located on said left side of said reference grid section, and said right lane marker line is located between said column of grid sections that said reference grid section is located on an adjacent column of grid sections located on said right side of said reference grid section.

15. The motor vehicle of claim 1, wherein said plurality of proximity sensors is a plurality of immediate vicinity sensors having a range of between 0 to 10 meters from said motor vehicle and a plurality of extended vicinity sensors having a range of between 10 to 300 meters from said motor vehicle.

16. The motor vehicle of claim 1, wherein said plurality of proximity sensors includes at least one sensor for an autonomous external object proximity location system and at least one sensor for a cooperative external object proximity location system.

17. The motor vehicle of claim 1, wherein the external object is selected from the group consisting of another motor vehicle, a pedestrian, a traffic signal and a lane marker on a road.

* * * * *